A. A. CAILLE.
SCALE.
APPLICATION FILED OCT. 22, 1913.

1,090,598.

Patented Mar. 17, 1914.
5 SHEETS—SHEET 1.

WITNESSES:

INVENTOR
Adolph A. Caille,
BY
Edward N. Pagelsen
ATTORNEY

A. A. CAILLE.
SCALE.
APPLICATION FILED OCT. 22, 1913.

1,090,598.

Patented Mar. 17, 1914.
5 SHEETS—SHEET 2.

WITNESSES:

INVENTOR
Adolph A. Caille
BY
Edward N. Pagelsen
ATTORNEY

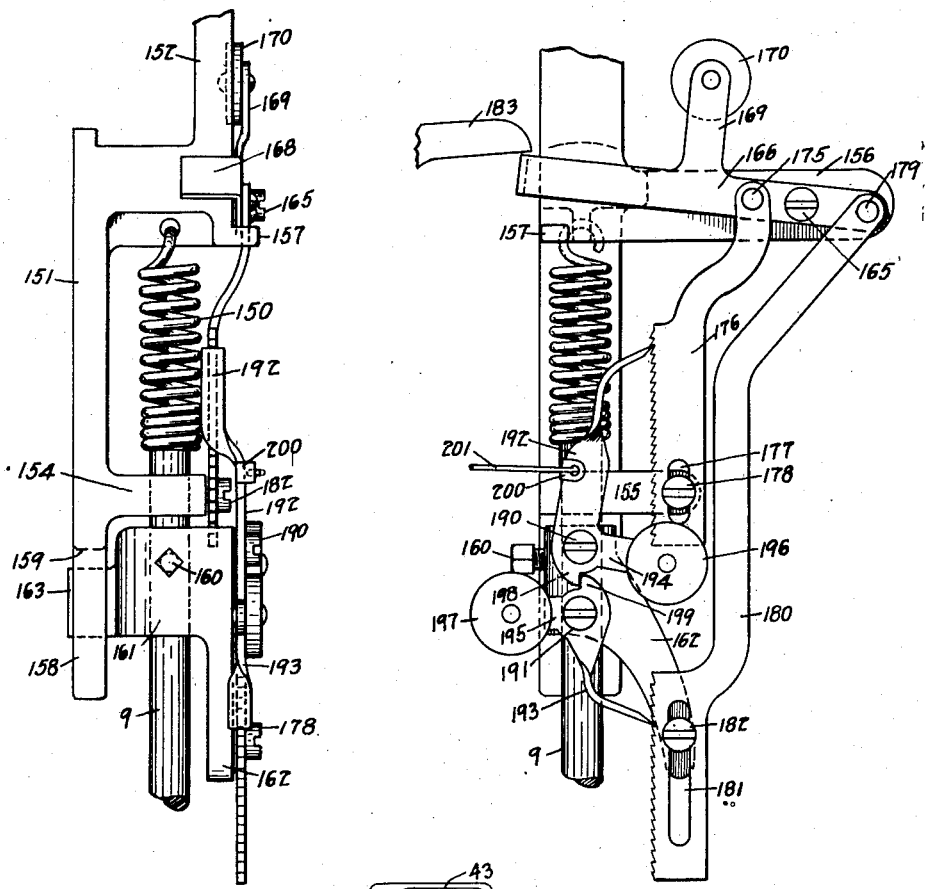

A. A. CAILLE.
SCALE.
APPLICATION FILED OCT. 22, 1913.
1,090,598.
Patented Mar. 17, 1914.
5 SHEETS—SHEET 4.
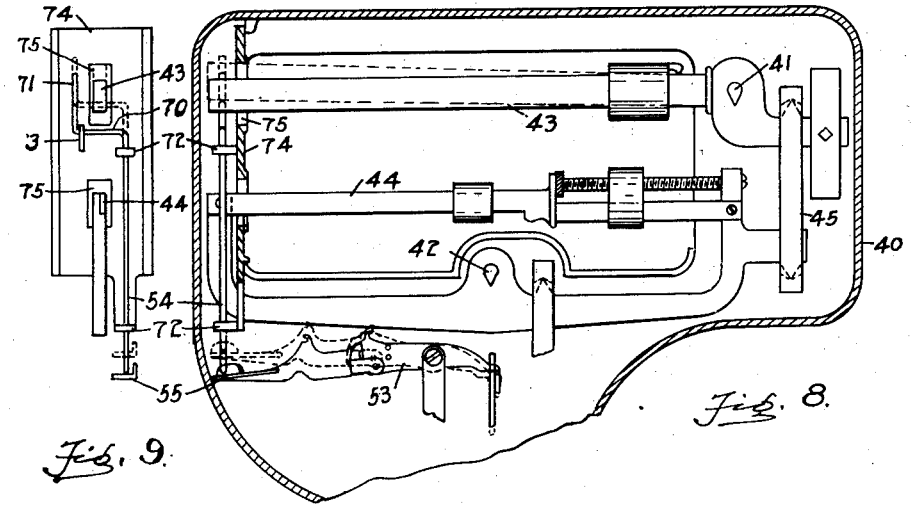
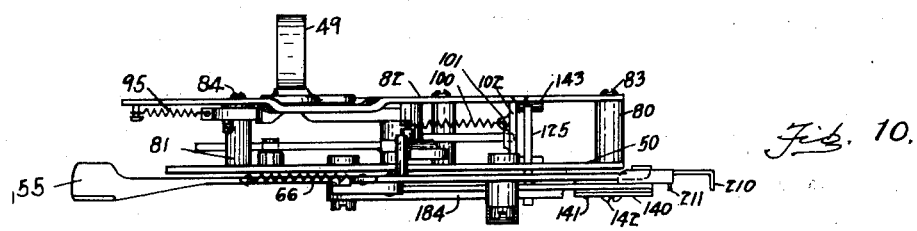
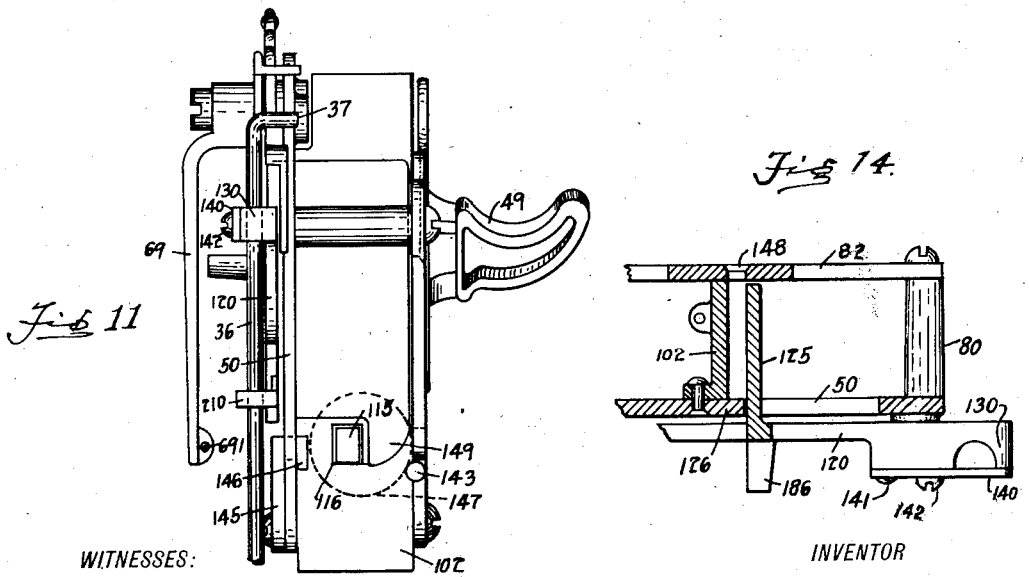
WITNESSES:
INVENTOR
Adolph A. Caille
BY
Edward N. Pagelsen
ATTORNEY

A. A. CAILLE.
SCALE.
APPLICATION FILED OCT. 22, 1913.

1,090,598.

Patented Mar. 17, 1914.
5 SHEETS—SHEET 5.

WITNESSES:
L. M. Spencer
Hugo W. Kreinbring

INVENTOR
Adolph A. Caille
BY
Edward N. Pagelsen
ATTORNEY

UNITED STATES PATENT OFFICE.

ADOLPH A. CAILLE, OF DETROIT, MICHIGAN.

SCALE.

1,090,598.  Specification of Letters Patent.  Patented Mar. 17, 1914.

Application filed October 22, 1913. Serial No. 796,555.

*To all whom it may concern:*

Be it known that I, ADOLPH A. CAILLE, a citizen of the United States, and a resident of Detroit, in the county of Wayne and State of Michigan, have invented a new and Improved Scale, of which the following is a specification.

This invention relates to coin-controlled weighing scales; and one of its objects is to provide means for automatically locking the beams of such a scale as soon as a load is placed on the load receiver.

Another object of this invention is to provid means for locking the beams as soon as the load is removed from the scale platform, or when the load on the platform is increased after the parts are in position for weighing, thereby preventing the weighing of more than one load upon the insertion of a single coin.

To accomplish the object first mentioned, this invention comprises an auxiliary mounting for the scale platform, and an auxiliary system of levers and rods connected thereto, one of the rods being adapted to be thrown up under the main beam whenever a load is placed upon the platform.

The invention further comprises a coin-operated mechanism whereby two members of this system of rods and levers are connected to each other upon the insertion of a coin.

To accomplish the second object mentioned, this invention comprises a main connecting bar having a spring attached thereto, the spring being tensioned by the load on the load receiver, in this case a platform, and certain mechanism whereby the tension of the spring is utilized, upon the load being decreased or increased, to release a locking lever and to allow parts to return to normal position, so that any variation in load on the platform will lock the scale beam.

This invention further consists in the novel details of construction shown and described, and particularly pointed out in the claims.

Figure 2:
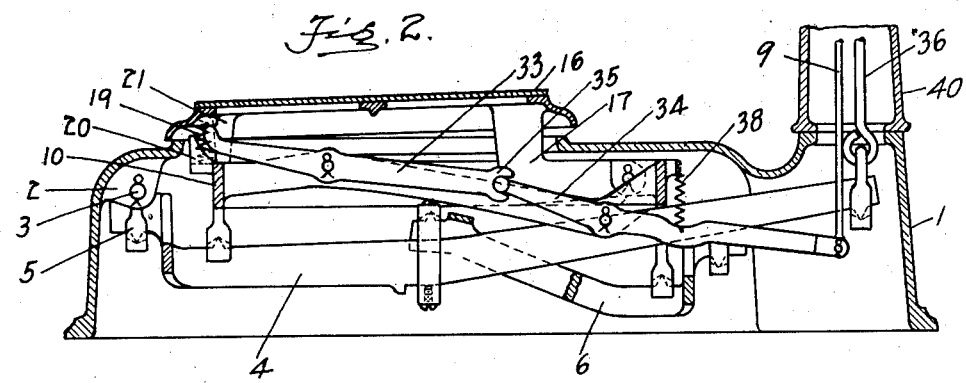
Figure 3:
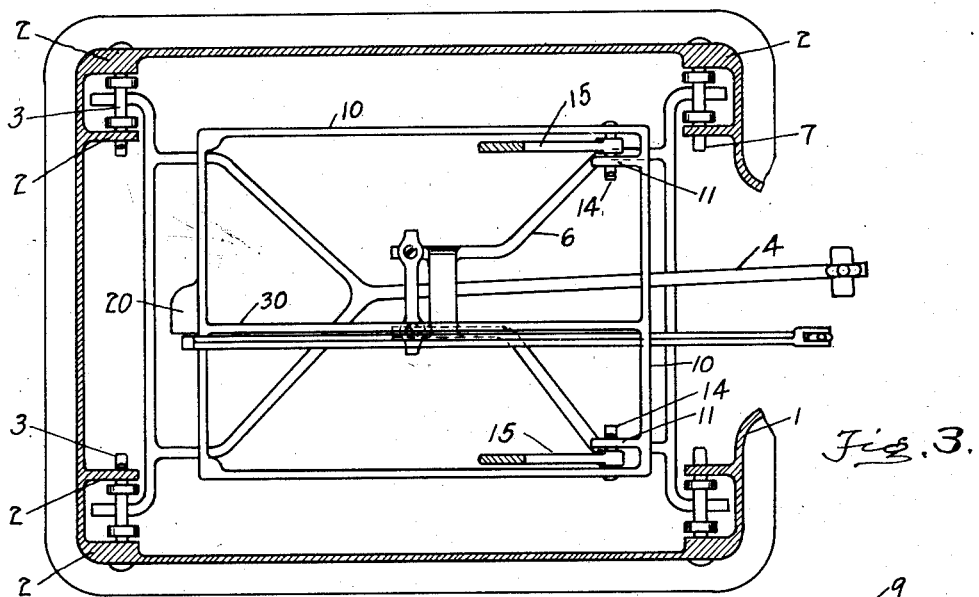
Figure 1:
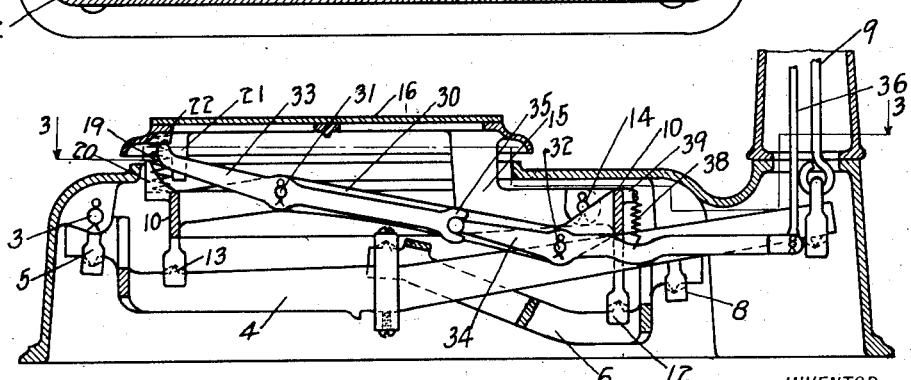
Figure 4:
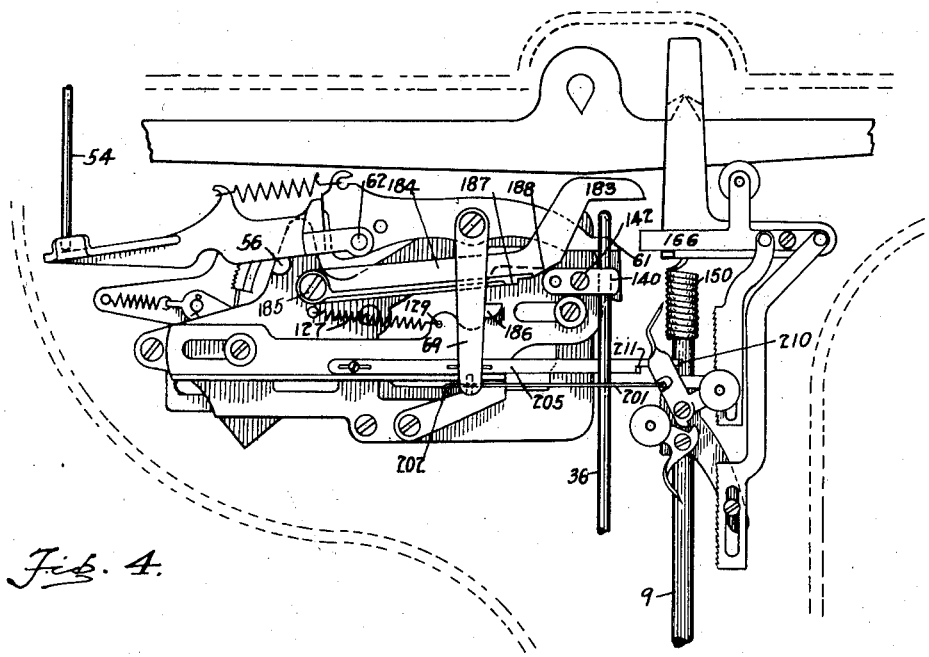
Figure 5:
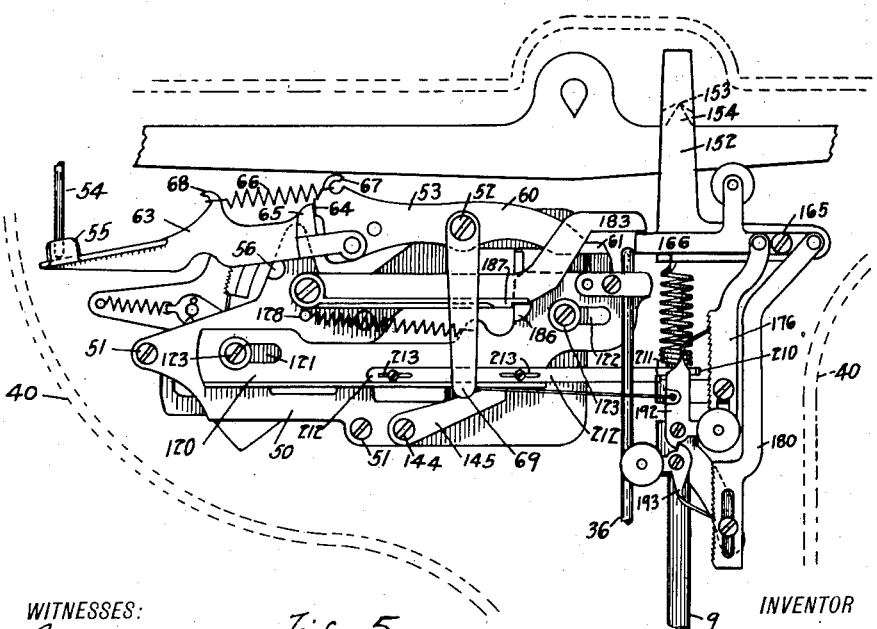
Figure 12:
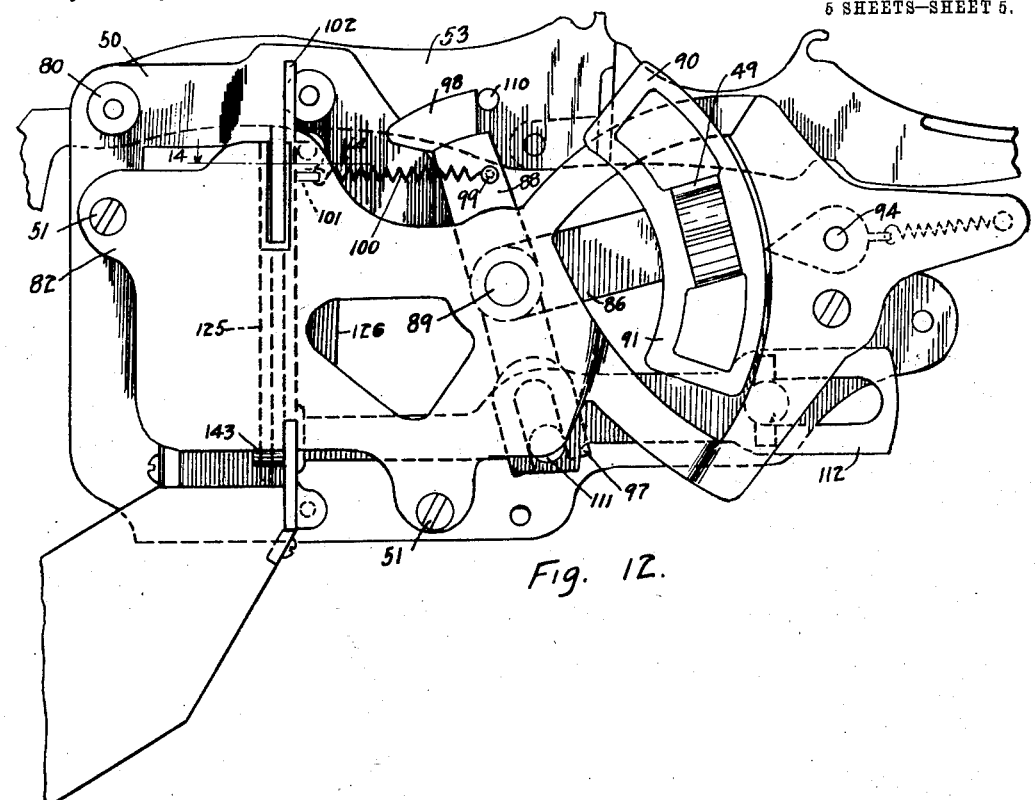
Figure 13:
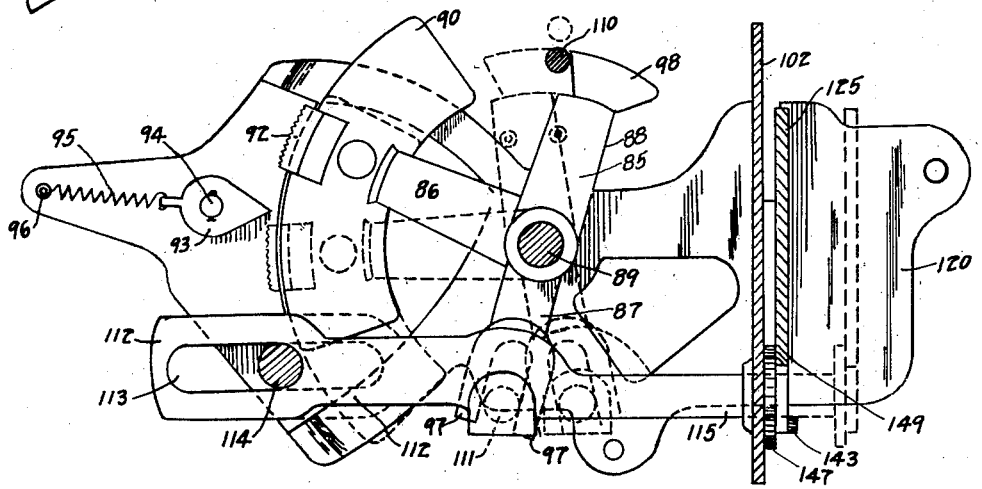

In the drawings, Figure 1 is a longitudinal section of the base, showing the auxiliary mounting of the platform and the auxiliary system of levers in the position it occupies when there is no weight upon the platform. Fig. 2 is a section similar to Fig. 1 but showing the system of levers in the position it occupies when a weight is on the platform. Fig. 3 is a section of Fig. 1 on the line 3—3, part of the base being omitted. Fig. 4 is a rear elevation of the mechanism that is located at the top of the pedestal, the parts being shown in the position they occupy when there is no load on the platform. Fig. 5 is a view similar to Fig. 4 but showing the parts in the position they occupy while the load is being weighed. Fig. 6 is a rear elevation of a portion of Fig. 5, showing the lock releasing lever in engagement with the end of the locking bar in the act of raising the latter, which is the position assumed by the parts at the moment the load is removed from the platform, or at the moment the load on the platform is increased. Fig. 7 is an end elevation of the parts shown in Fig. 6. Fig. 8 is a vertical section showing the mechanism for locking the scale beam, the dotted lines indicating the position taken when the beam is locked. Fig. 9 is an end view of the parts shown in Fig. 8, the casing being omitted. Fig. 10 is a plan of certain of the parts shown in Figs. 4 and 5. Fig. 11 is an end view of the same parts. Fig. 12 is a front elevation of part of the mechanism shown in Fig. 4 and Fig. 13 is a view corresponding to Fig. 4 and Fig. 5, certain of the parts being removed. Fig. 14 is a section on the line 14—14 of Fig. 12, looking in the direction indicated by the arrows. Fig. 15 is a front elevation of the machine on a greatly reduced scale.

Similar characters of reference refer to like parts throughout the several views.

The base 1 (Figs. 1, 2 and 3) has lugs 2 formed on its inner side that carry the pivots 3 upon which the main lever 4 of the scale is supported by chairs 5 in the ordinary manner. The secondary lever 6 is swung from pivots 7 in the lugs 2 at the other end of the base by means of chairs 8, one end of this lever being connected to the lever 4, one end of which is attached to a main connecting rod 9 in any well known manner.

A spider 10, having the lugs 11 thereon, is supported upon the levers 4 and 6 by the knife edges 12 and 13. Mounted to swing vertically upon the lugs 11 by means of the pivots 14 and the downwardly and laterally extending arms 15 is the scale platform 16, the opposite end of which is normally supported by a spring 19 that rests on a seat 20 formed upon spider 10. The platform 16 has downwardly extending lugs 21 that are adapted to contact with and rest directly upon spider 10 whenever the load on the platform is sufficient to overcome the strength of spring 19. The platform also has formed upon its lower side a contacting face 22 for a purpose hereinafter pointed out. The spider 10 includes a bent longitudinally extending bar 30 upon which pivots 31 and 32 are mounted, and turning upon these pivots are levers 33 and 34, respectively, whose adjacent ends are engaged with each other by a Y or slotted joint, as indicated at 35. The rear end of the lever 34 attaches to an auxiliary connecting rod 36 (having a laterally bent upper end 37, Fig. 11), and is normally drawn upwardly about pivot 32 by the tension spring 38 that is secured to the lug 39 on the spider 10. The same spring also holds the front end of the lever 33 in engagement with the contacting face 22 of the platform 16, previously referred to.

The pedestal 40, that together with the base 1 forms the frame of the scale, has supported therein upon pivots 41 and 42, respectively, the main beam 43 and the balancing beam 44, that are connected in any desired manner, as by the link 45. As soon as a load is placed upon platform 16, the main beam 43 is thrown up and held in the position shown by the dotted lines through the action of the auxiliary connecting rod 36 upon mechanism that will now be described.

A supporting plate 50 may be attached, by means of screws 51 or otherwise, to the irregular inner surface of the head of the pedestal (Figs. 4 and 5) which is indicated in dotted lines. This plate is provided with a pivot 52 and turning thereon is a lever indicated as a whole by 53, upon whose outer end a locking rod 54 is carried and rests in a seat 55. The plate 50 has a lug 56 projecting from the side thereof, upon which the lever 53 is normally adapted to rest.

The lever 53 comprises a rigid member 60 having a projection 61 with which the laterally bent end 37 of the auxiliary connecting rod 36 is adapted to engage, as shown in Fig. 4, the opposite end of the member 60 carrying a pivot 62 about which a second rigid member 63 is mounted to swing in a vertical plane. The member 60 is provided with a seat 64, against which a lug 65 on the member 63 is adapted to contact, the lug and seat being normally held in engagement by the tension spring 66 that is secured to projections 67 and 68 on members 60 and 63, respectively. This spring is of such strength that the two parts 60 and 63 normally constitute a single operative member. The member 60 has rigidly secured thereto a downwardly extending arm 69 that is provided with a perforated lug 691, as shown in Fig. 11, whose purpose will be indicated later.

The locking rod 54 (see Figs. 8 and 9) is formed with a laterally bent portion 70 and a vertically extending end 71, and is mounted to slide vertically in guides 72 and to rest against a stop 73, which are connected to a member 74 that is attached to the head of the pedestal in any desired manner at the left end of the opening therein (Fig. 8). This member 74 has slots 75 formed therein within which the main scale beam 43 and the balancing beam 44 are adapted to vibrate vertically.

It will be seen that when a load is placed upon the scale platform, the auxiliary rod 36 is drawn downwardly and that it engages, when in the position shown in Fig. 4, with the projection 61 on member 60 and raises rod 54 to locking position. It will also be seen that, because of the spring connection between the members 60 and 63 of lever 53, a person disposed to tamper with the scale may depress the scale beams without breaking the locking mechanism.

The means for unlocking the beam locking mechanism will now be described. The plate 50 is provided with the forwardly projecting bosses 80 and 81, best shown in Fig. 10, to which a second plate 82 is secured, preferably by screws 83 and 84. Between the plates 80 and 81 a lever 85 having three arms 86, 87 and 88, (Figs. 12 and 13) is mounted to swing about the pivot 89, supported by the two plates 50 and 82. The arm 86 has projecting from its front side a thumb-piece 49 (Figs. 10 and 11) that extends through a slot in the front face of the head of the pedestal, the slot being closed by extensions 90 and 91 that may be formed integral with the arm 86, the latter being also provided with a rack 92 with which a full-stroke ratchet 93, pivoted at 94 in the plate 82, is adapted to engage. The ratchet is normally held in the position shown in Fig. 13 by a tension spring 95 that is secured to the plate 82 at 96. The arm 87 has bifurcations 97 at its outer end; and the arm 88 has formed therewith a head 98 for a purpose hereinafter specified. The arm 88 has secured thereto at 99 a tension spring 100 (Fig. 12), the other end of which may be attached at 101 to the side 102 of a coin-guide, the spring normally holding the lever in the position shown in Fig. 12. The lever 53 has formed upon its front side a projection 110 that is normally engaged behind the head 98 (Fig. 12). The bifurcated end of the member 87 engages with a pin 111 on a sliding actuating bar 112, one end of which has formed therein a slot 113 that engages over a guide pin 114, projecting from the plate 50. The other end 115 of the sliding bar passes through a guide slot 116 in the side 102 of the coin guide. See also Fig. 11.

The plate 50 is also provided with screws 123 which extend through the slots 121 and 122 of the slidable plate 120, the plate being extended forwardly in the form of a cross-piece 125 that forms the second side of the coin guide (Fig. 10). The cross-piece is normally held in engagement with a web 126 (Figs. 12 and 14) of the plate 50, and is spaced thereby from the side of the coin guide 102 a distance greater than the thickness of a coin, by a tension spring 127 that is anchored to the plate 50 at 128 and is secured to the sliding plate at 129. The sliding plate is extended laterally at 130 (Figs. 11 and 14) to form a guide for the rod 36 which is loosely secured therein by a plate 140, preferably connected to the sliding plate by a pin 141 and a screw 142. The side 102 of the coin guide has projecting therefrom a pin shaped guide member 143, and secured to plate 50 by a screw 144, is a piece 145 having an inwardly projecting end 146 (Fig. 11) that extends through an opening in the plate 50, and forms a second guide member for a coin 147 that may be inserted in a slot 148 in the plate 50 between the cross-piece 102 and the other side 125 of the coin guide. The cross-piece has a downwardly projecting end 149 (Fig. 11) against which the coin is held by the end 115 of the actuating bar 112 whenever the bar is moved to the right, as shown in Fig. 13.

It will be seen that the coin, when in the position just referred to, constitutes a temporary connecting member between the actuating bar 112 and the sliding plate 120, the part 125 being connected thereto. Assuming the sliding plate to have been moved to the forward end of its stroke as indicated in dotted lines in Fig. 13, and there held and the actuating bar withdrawn, the coin will fall into a coin chute of ordinary construction, shown in Fig. 12. The rack 92, heretofore referred to, is of a length just sufficient to prevent the actuating bar from being withdrawn before the end of its forward stroke, at the termination of which the ratchet 93 rides off it and is thrown to neutral position by spring 95, as indicated in Fig. 13. The spring 100 then returns the three-armed lever to the locked position indicated in Fig. 12. The term "forward stroke" signifies a movement to the right in Fig. 13.

The main connecting rod 9 has secured to its upper end a spring 150 that is attached to a connecting member 151, the details of which are shown in Figs. 4, 5, 6 and 7. This member is provided with a laterally-offset vertically projecting upper end 152, which has formed therein a seat 153 for a knife edge on the frame of the balancing beam 44, and with a perforated lug 154 having an arm 155 thereon, the rod 9 passing through the perforation in the lug. It is further provided with an arm 156 (Fig. 6) and a seat 157, and with a slotted lower end 158, the upper limit of the slot being indicated at 159 in Fig. 7. The main connecting rod 9 has attached thereto, preferably by a set-screw 160, a block 161 having a downwardly extending arm 162, and a laterally extending projection 163 that is received by the guide slot in the lower end of the member 151.

The arm 156 supports a pivot 165 upon which a lock-bar releasing lever 166 is mounted, the latter having a laterally turned end 168 and an upwardly extending arm 169, provided with a counterpoise 170. Pivotally suspended at 175 from lever 166 is a ratchet-bar 176 having a slot 177 in its lower end. A screw-threaded pin 178, mounted in the arm 155, passes through the slot and guides the rack-bar in its vertical movement. Pivotally suspended from a point 179 on the opposite side of the pivot 165 of the lock-bar releasing lever is a second ratchet-bar 180 having a slot 181 in its lower end. A screw-threaded pin 182, mounted in arm 162 and extending through the slot, guides this rack-bar in its vertical movement. The weight of the counterpoise 170 is sufficient to normally cause the lock releasing lever to rest on the seat 157.

The end of the releasing lever 166 is adapted to contact with the end 183 of a pivoted locking bar 184 that is mounted to swing vertically on the plate 50 at 185. The sliding plate 120 has formed thereon an abutment 186, and the locking bar has a shoulder 187, on its under side, that is adapted to fall behind the abutment and hold the sliding plate in the position indicated in Fig. 5. The locking bar also has an inclined lower surface 188 that is adapted to contact with and rest upon the plate 140 when the parts are in the position shown in Fig. 4.

Mounted upon pins 190 and 191, screw-threaded in the block 161, are the dogs 192 and 193, that are adapted to engage respectively with the ratchet-bars 176 and 180. These dogs are provided with counterpoises 196 and 197, respectively; and are further provided with inter-engaging lugs 198 and 199 by means of which any tendency of the dog 192 to turn in a counter-clockwise direction about its pivot (Fig. 6) is transmitted to dog 191, to cause the same to turn in a clockwise direction about its pivot. The dog 192 has formed thereon a perforated projection 200, and secured to this perforated projection is one end of a wire 201, the other end of which is passed through the perforation in the lug 691 on the bar 69 (shown in Fig. 11) and is bent as shown at 202 in Fig. 4. The dog 192 is loosely embraced by the lateral projections 210 and 211 on a bar 212 (Figs. 5 and 10) that may be adjustably secured to the sliding plate 120 by the pin-and-slot connections 213.

Operation: The first step in the operation of this scale is that of locking the scale beams in position. Whenever a load, sufficient to overcome the strength of the spring 19, is placed upon the platform, the latter sinks about its pivots 14 until the lugs 21 contact with the spider 10. Through the action of the levers 33 and 34, the auxiliary connecting rod 36 is pulled downwardly so that its bent upper end 37 engages with the end 61 of lever 53 in the head of the pedestal and turns the latter about its pivot 52. The seat 55 on the other end of the lever is thereby carried upwardly, and, with it, the locking rod 54, the bent portion 70 of which engages with the under side of the main beam 43 and prevents the beams from swinging freely. It will be seen that the swinging of the lever 53 raises the pin 110 thereon out of the path of the head 98 of the three-armed lever as shown in Fig. 13, and that the latter may then be turned about the pivot 89 by pressure applied to the thumb-piece 49. Any turning of the three-armed lever, however, produces no effect upon the locking rod 54 until a coin 147 is inserted in the coin guide for the reason that, without the connecting coin, the end 115 of the actuating bar slides idly in the slot 116, and does not affect the sliding plate 120. The next step is the insertion of a coin 147, which falls through the slot 148 in the plate 82 into the position shown in Fig. 11. Upon pressure now being applied to the thumb-piece 49, the actuating bar 112 carries the coin forward, that is, to the right in Fig. 13, and, with it, because of its contact with cross-piece 125, the sliding plate 120, until the plate 140 has passed from engagement with the inclined surface 188 on the locking bar 184. The latter then falls with its shoulder 187 behind the abutment 186 on the sliding plate 120, whereby the latter is held in the position shown in Fig. 5, and with its end 183 in the path of the end of the releasing lever 166. At the same time, due to the fact that the auxiliary connecting rod 36 is embraced by the plate 140, its upper end 37 is swept to the right in Fig. 5 out of the path of the end 61 of the lever 53, which then swings counter-clockwise on the pivot 52, thus allowing the locking rod 54 to fall and freeing the scale bars. Therefore, the locking rod 54 cannot free the beams until a load is on the platform and a coin has been inserted. Any load on the platform sufficient to overcome the tension of the spring 19, under the platform, may be divided into two parts, one of which raises the locking rod 54 in the manner described.

The other part is transmitted by the main connecting rod 9 to spring 150 and causes an elongation thereof, as indicated in Fig. 5. This draws the block 161 downwardly in respect to the member 151, and thereby lowers the ratchets 192 and 193 in respect to the teeth on the corresponding ratchet bars 176 and 180. It is apparent that any diminution of the weight of the load upon the platform, after the ratchets are engaged with the ratchet-bars, will cause a shortening of spring 150, and will, by means of ratchet 192 and ratchet-bar 176, elevate the counterweighted end of lever 166 and cause it to engage with the end 183 of the locking bar 184, thereby releasing the bar from engagement with the sliding plate, which will instantly return to normal position, and at the same time return the end 37 of rod 36 to position over the end 61 of lever 53. On the other hand, it is also apparent that any increase in the load upon the platform, after the ratchets are engaged with the ratchet-bars, will cause a further lengthening of the spring 150, and will, by means of ratchet 193 and ratchet-bar 180, elevate the counterweighted end of the lever 166 and cause it to engage with and release the locking bar as before. In either case, the reëngagement of the auxiliary connecting rod 36 with the lever 53 immediately raises the locking rod 54 into contact with the scale beam. Thus there is provided a device whereby any increase or diminution of the weight on the platform, after the ratchets are engaged with the ratchet-bars, is utilized to instantly lock the scale beam, and to prevent further weighing until after the insertion of a second coin. The ratchets are held from engagement with the ratchet-bars and any stripping of the teeth from the bars, which might be caused by vibration of the platform as a person steps on or off, is prevented by the wire 201. As the sliding plate 120 moves from the position shown in Fig. 4 to that shown in Fig. 5, carrying with it the rod 36, the upper end of this rod contacts with the end of lever 166 and pushes the member 151 a slight distance to the right in Fig. 5. At the same time, the projection 211 on the bar 212 contacts with the ratchet and pushes it over so that it is almost in engagement with the ratchet-bar, but it is prevented from actually engaging with the ratchet-bar by the wire 201, whose bent end at this time comes in contact with the lug on the arm 69. As soon as the thumb-piece is released, the sliding plate is pulled back a slight distance so that its abutment 186 contacts with the shoulder 187 on the locking bar 184, and the member 151 swings very slightly in a clockwise direction (Fig. 5) about its seat on the frame of the scale beam, which causes engagement of the ratchet-bar 176 with the ratchet 192. Because of the interengaging lugs 198 and 199, the ratchet 193 is held from engagement with the ratchet-bar 180 during the time in which ratchet 192 is held away from the ratchet-bar 176, and is allowed to be engaged with its ratchet-bar by the action of the counterpoise 197 whenever the ratchet 192 is engaged with the ratchet-bar 176.

It is evident that many changes may be made in the described device by those skilled in the art without departing from the spirit of my invention.

Having now described my construction, what I regard as my invention and desire to secure by Letters Patent is:

1. In a scale, a frame, a platform and a scale beam mounted thereon, a main connecting rod and an auxiliary connecting rod connected to the platform so as to be actuated by a load placed thereon, a locking device adapted to be moved into position to prevent the scale beam from vibrating freely, means whereby the auxiliary connecting rod may be connected to the locking device so as to move the same to locking position, means for breaking the connection between the auxiliary connecting rod and the locking device, said means comprising a movable plate, means for normally holding the plate at one limit of its movement, and means for locking the plate at the other limit of its movement, the main connecting rod having a spring secured thereto, a member connected to the scale beam and to the spring, the length of the latter being changed by the weight of a load on the platform, and means, actuated by the spring as it returns to normal length, for releasing the plate locking means to allow the plate to be returned to its normal position when the load on the platform is decreased.

2. In a scale, a frame, a platform and a scale beam mounted thereon, a main connecting rod and an auxiliary connecting rod connected to the platform so as to be actuated by a load placed thereon, a locking device adapted to be moved into position to prevent the scale beam from vibrating freely, means whereby the auxiliary connecting rod may be connected to the locking device so as to move the same to locking position, means for breaking the connection between the auxiliary connecting rod and the locking device, said means comprising a movable plate, means for normally holding the plate at one limit of its movement, and means for locking the plate at the other limit of its movement, the main connecting rod having a spring secured thereto, a member connected to the scale beam and to the spring, the length of the latter being changed by the weight of a load on the platform, and means, actuated by the spring as its length increases, for releasing the plate locking means to allow the plate to be returned to its normal position when the load on the platform is increased.

3. In a scale, a frame, a platform and a scale beam mounted thereon, a main connecting rod and an auxiliary connecting rod connected to the platform so as to be actuated by a load placed thereon, a locking device adapted to be moved into position to prevent the scale beam from vibrating freely, means whereby the auxiliary connecting rod may be connected to the locking device so as to move the same to locking position, means for breaking the connection between the auxiliary connecting rod and the locking device, said means comprising a sliding plate, means for normally holding the plate at one limit of its movement, and means for locking the plate at the other limit of its movement, the main connecting rod having one end of a spring attached thereto, a member secured to the other end of the spring, the length of the spring being changed by the weight of a load on the platform, said member being adapted to actuate the scale beam, a pivot on the member, a lever mounted on the pivot, said lever being adapted to release the plate locking means from engagement with the plate, and means actuated by the spring for turning the lever, as the spring returns to normal length, to release the plate locking means and allow the plate to be returned to its normal position when the load on the platform is decreased.

4. In a scale, a frame, a platform and a scale beam mounted thereon, a main connecting rod and an auxiliary connecting rod connected to the platform so as to be actuated by a load placed thereon, a locking device adapted to be moved into position to prevent the scale beam from vibrating freely, means whereby the auxiliary connecting rod may be connected to the locking device so as to move the same to locking position, means for breaking the connection between the auxiliary connecting rod and the locking device, said means comprising a sliding plate, means for normally holding the plate at one limit of its movement, and means for locking the plate at the other limit of its movement, the main connecting rod having one end of a spring attached thereto, a member secured to the other end of the spring, said member being adapted to actuate the scale beam, the length of the spring being changed by the weight of a load on the platform, a pivot on the member, a lever mounted on the pivot, said lever being adapted to release the plate locking means from engagement with the plate, and means actuated by the spring for turning the lever, as the length of the spring increases, to release the plate locking means and allow the plate to be returned to its normal position when the load on the platform is increased.

5. In a scale, a frame, a platform and a scale beam mounted thereon, a main connecting rod and an auxiliary connecting rod connected to the platform so as to be actuated by a load placed thereon, a locking device adapted to be moved into position to prevent the scale beam from vibrating freely, means whereby the auxiliary connecting rod may be connected to the locking device so as to move the same to locking position, means for breaking the connection between the auxiliary connecting rod and the locking device, said means comprising a movable plate, means for normally holding the plate at one limit of its movement, means for locking the plate at the other limit of its movement, the main connecting rod having one end of a spring attached thereto, a member secured to the other end of the spring, said member being adapted to actuate the scale beam, a pivot on the member, a lever mounted on the pivot, said lever being adapted to release the locking means from engagement with the plate, a ratchet-bar secured to the lever at one side of the pivot, a block attached to the main connecting rod, and a ratchet mounted on the block and adapted to engage with the teeth of the ratchet-bar to turn the lever about its pivot to release the plate locking means from engagement with the plate when the load on the platform is decreased.

6. In a scale, a frame, a platform and a scale beam mounted thereon, a main connecting rod and an auxiliary connecting rod connected to the platform so as to be actuated by a load placed thereon, a locking device adapted to be moved into position to prevent the scale beam from vibrating freely, means whereby the auxiliary connecting rod may be connected to the locking device so as to move the same to locking position, means for breaking the connection between the auxiliary connecting rod and the locking device, said means comprising a movable plate, means for normally holding the plate at one limit of its movement, means for locking the plate at the other limit of its movement, the main connecting rod having one end of a spring attached thereto, a member secured to the other end of the spring, said member being adapted to actuate the scale beam, a pivot on the member, a lever mounted on the pivot, said lever being adapted to release the locking means from engagement with the plate, a ratchet-bar secured to the lever at one side of the pivot, said ratchet-bar having a slot therein, a pin secured to the member and projecting through the slot to guide the ratchet-bar, a block attached to the main connecting rod so as to move therewith, a pivot on the block and a ratchet mounted on the pivot, said ratchet being adapted to engage with the teeth of the ratchet-bar to cause the lever to release the plate locking means from engagement with the plate when the load on the platform is decreased.

7. In a scale, a frame, a platform and a scale beam mounted thereon, a main connecting rod and an auxiliary connecting rod connected to the platform so as to be actuated by a load placed thereon, a locking device adapted to be moved into position to prevent the scale beam from vibrating freely, means whereby the auxiliary connecting rod may be connected to the locking device so as to move the same to locking position, means for breaking the connection between the auxiliary connecting rod and the locking device, said means comprising a movable plate, means for normally holding the plate at one limit of its movement, means for locking the plate at the other limit of its movement, the main connecting rod having one end of a spring attached thereto, a member secured to the other end of the spring, said member being adapted to actuate the scale beam, a pivot on the member, a lever mounted on the pivot, said lever being adapted to release the locking means from engagement with the plate, a ratchet-bar secured to the lever at one side of the pivot, said ratchet-bar having a slot therein, a block attached to the main connecting rod, a pin on the block, said pin projecting through the slot to guide the ratchet-bar, a pivot on the block, a ratchet mounted on the pivot, said ratchet being adapted to engage with the teeth of the ratchet-bar to cause the lever to release the plate locking means from engagement with the plate when the load on the platform is increased.

8. In a scale, a frame, a platform and a scale beam mounted thereon, a main connecting rod and an auxiliary connecting rod connected to the platform so as to be actuated by a load placed thereon, a locking device adapted to be moved into position to prevent the scale beam from vibrating freely, means whereby the auxiliary connecting rod may be connected to the locking device so as to move the same to locking position, means for breaking the connection between the auxiliary connecting rod and the locking device, said means comprising a movable plate, means for normally holding the plate at one limit of its movement, means for locking the plate at the other limit of its movement, the main connecting rod having one end of a spring attached thereto, a member secured to the other end of the spring, said member being adapted to actuate the scale beam, a pivot on the member, a lever mounted on the pivot, said lever being adapted to release the locking means from engagement with the plate, a ratchet-bar secured to the lever at one side of the pivot, said ratchet-bar having a slot therein, a pin secured to the member and projecting through the slot to guide the ratchet-bar, a block attached to the main connecting rod so as to move therewith, a pivot on the block, a ratchet mounted on the pivot, said ratchet being adapted to engage with the teeth of the ratchet-bar to cause the lever to release the plate locking means from engagement with the plate when the load on the platform is decreased, and a bar secured to the sliding plate having a projection thereon adapted to contact with the ratchet and withdraw the same from engagement with the ratchet-bar.

9. In a scale, a frame, a platform and a scale beam mounted thereon, a main connecting rod and an auxiliary connecting rod connected to the platform so as to be actuated by a load placed thereon, a locking device adapted to be moved into position to prevent the scale beam from vibrating freely, means whereby the auxiliary connecting rod may be connected to the locking device so as to move the same to locking position, means for breaking the connection between the auxiliary connecting rod and the locking device, said means comprising a movable plate, means for normally holding the plate at one limit of its movement, means for locking the plate at the other limit of its movement, the main connecting rod having one end of a spring attached thereto, a member secured to the other end of the spring, said member being adapted to actuate the scale beam, a pivot on the member, a lever mounted on the pivot, said lever being adapted to release the locking means from engagement with the plate, a ratchet-bar secured to the lever at one side of the pivot, said ratchet-bar having a slot therein, a pin secured to the member and projecting through the slot to guide the ratchet-bar, a block attached to the main connecting rod so as to move therewith, a pivot on the block, a ratchet mounted on the pivot, said ratchet being adapted to engage with the teeth of the ratchet-bar to cause the lever to release the plate locking means from engagement with the plate when the load on the platform is decreased, and a bar secured to the sliding plate and having projections thereon adapted to contact with the ratchet, one of the projections serving to throw the ratchet over toward the position in which it engages with the ratchet-bar, and the other projection serving to withdraw the ratchet from engagement with the ratchet-bar.

10. In a scale, a frame, a platform and a scale beam mounted thereon, a main connecting rod and an auxiliary connecting rod connected to the platform so as to be actuated by a load placed thereon, a locking device adapted to be moved into position to prevent the scale beam from vibrating freely, means whereby the auxiliary connecting rod may be connected to the locking device so as to move the same to locking position, means for breaking the connection between the auxiliary connecting rod and the locking device, said means comprising a movable plate, means for normally holding the plate at one limit of its movement, means for locking the plate at the other limit of its movement, the main connecting rod having one end of a spring attached thereto, a member secured to the other end of the spring, said member being adapted to actuate the scale beam, a pivot on the member, a lever mounted on the pivot, said lever being adapted to release the locking means from engagement with the plate, a ratchet-bar secured to the lever at one side of the pivot, said ratchet-bar having a slot therein, a pin secured to the member and projecting through the slot to guide the ratchet-bar, a block attached to the main connecting rod so as to move therewith, a pivot on the block, a ratchet mounted on the pivot, said ratchet being adapted to engage with the teeth of the ratchet-bar to cause the lever to release the plate locking means from engagement with the plate when the load on the platform is decreased, and a bar adjustably secured to the sliding plate, said bar being adapted to swing the ratchet over toward the position in which it engages with the ratchet-bar, or to withdraw the ratchet from engagement with the ratchet-bar, depending on the direction of movement of the plate.

11. In a scale, a frame, a platform and a scale beam mounted thereon, a main connecting rod and an auxiliary connecting rod connected to the platform so as to be actuated by a load placed thereon, a locking device adapted to be moved into position to prevent the scale beam from vibrating freely, means whereby the auxiliary connecting rod may be connected to the locking device so as to move the same to locking position, means for breaking the connection between the auxiliary connecting rod and the locking device, said means comprising a movable plate, means for normally holding the plate at one limit of its movement, means for locking the plate at the other limit of its movement, the main connecting rod having one end of a spring attached thereto, a member secured to the other end of the spring, said member being adapted to actuate the scale beam, a pivot on the member, a lever mounted on the pivot, said lever being adapted to release the locking means from engagement with the plate, a ratchet-bar secured to the lever at one side of the pivot, said ratchet-bar having a slot therein, a pin secured to the member and projecting through the slot to guide the ratchet-bar, a block attached to the main connecting rod so as to move therewith, a pivot on the block, a ratchet mounted on the pivot, said ratchet being adapted to engage with the teeth of the ratchet-bar to cause the lever to release the plate locking means from engagement with the plate when the load on the platform is decreased, a second pivot on the block, a second ratchet mounted thereon, a second ratchet-bar pivotally mounted on the lever at the side of the pivot opposite to that on which the first mentioned ratchet-bar is mounted, said second ratchet-bar having a slot therein, and a pin on the block projecting through the slot to guide the ratchet-bar, said second ratchet-bar being adapted to be engaged by the second ratchet, and to cause the lever to release the plate locking means from engagement with the plate when the load on the platform is increased.

12. In a scale, a frame, a platform and a scale beam mounted thereon, a main connecting rod and an auxiliary connecting rod connected to the platform so as to be actuated by a load placed thereon, a locking device adapted to be moved into position to prevent the scale beam from vibrating freely, means whereby the auxiliary connecting rod may be connected to the locking device so as to move the same to locking position, means for breaking the connection between the auxiliary connecting rod and the locking device, said means comprising a movable plate, means for normally holding the plate at one limit of its movement, means for locking the plate at the other limit of its movement, the main connecting rod having one end of a spring attached thereto, a member secured to the other end of the spring, said member being adapted to actuate the scale beam, a pivot on the member, a lever mounted on the pivot, said lever being adapted to release the locking means from engagement with the plate, a ratchet-bar secured to the lever at one side of the pivot, said ratchet-bar having a slot therein, a pin secured to the member and projecting through the slot to guide the ratchet-bar, a block attached to the main connecting rod so as to move therewith, a pivot on the block, a ratchet mounted on the pivot, said ratchet being adapted to engage with the teeth of the ratchet-bar to cause the lever to release the plate locking means from engagement with the plate when the load on the platform is decreased, a second ratchet carried by the block, and a second ratchet-bar secured to the lever, the second ratchet being adapted to engage with the second ratchet-bar, and to cause the lever to release the plate locking means from engagement with the plate when the load on the platform is increased.

13. In a scale, a frame, a platform and a scale beam mounted thereon, a main connecting rod and an auxiliary connecting rod connected to the platform so as to be actuated by a load placed thereon, a locking device adapted to be moved into position to prevent the scale beam from vibrating freely, means whereby the auxiliary connecting rod may be connected to the locking device so as to move the same to locking position, means for breaking the connection between the auxiliary connecting rod and the locking device, said means comprising a movable plate, means for normally holding the plate at one limit of its movement, means for locking the plate at the other limit of its movement, the main connecting rod having one end of a spring attached thereto, a member secured to the other end of the spring, said member being adapted to actuate the scale beam, a pivot on the member, a lever mounted on the pivot, said lever being adapted to release the locking means from engagement with the plate, a ratchet-bar secured to the lever at one side of the pivot, said ratchet-bar having a slot therein, a block attached to the main connecting rod, so as to move therewith, a pin projecting from the block and through the slot to guide the ratchet-bar, a pivot on the block, a ratchet mounted on the pivot, said ratchet being adapted to engage with the teeth of the ratchet-bar to cause the lever to release the plate locking means from engagement with the plate when the load on the platform is increased.

14. In a scale, a frame, a platform and a scale beam mounted thereon, a main connecting rod and an auxiliary connecting rod connected to the platform so as to be actuated by a load placed thereon, a locking device adapted to be moved into position to prevent the scale beam from vibrating freely, means whereby the auxiliary connecting rod may be connected to the locking device so as to move the same to locking position, means for breaking the connection between the auxiliary connecting rod and the locking device, said means comprising a movable plate, means for normally holding the plate at one limit of its movement, means for locking the plate at the other limit of its movement, the main connecting rod having one end of a spring attached thereto, a member secured to the other end of the spring, said member being adapted to actuate the scale beam, a pivot on the member, a lever mounted on the pivot, said lever being adapted to release the locking means from engagement with the plate, a ratchet-bar secured to the lever at one side of the pivot, said ratchet-bar having a slot therein, a block attached to the main connecting rod so as to move therewith, a pin projecting from the block and through the slot to guide the ratchet-bar, a ratchet mounted on the block, said ratchet being adapted to engage with the teeth on the ratchet-bar to cause the lever to release the plate locking means from engagement with the plate when the load on the platform is increased, and means secured to the sliding plate for withdrawing the ratchet from engagement with the ratchet-bar.

15. In a scale, a frame, a platform and a scale beam mounted on the frame, a main connecting rod and an auxiliary connecting rod connected to the platform so as to be actuated by a load placed thereon, a lever carried by the frame, one end of the lever being adapted to be engaged by the auxiliary connecting rod, a projection upon the lever, a second lever carried by the frame, said second lever being normally locked in position by the projection on the first lever and being released therefrom by the weight of a load on the platform, an actuating bar connected to the lever, a sliding plate adapted to be temporarily connected to the actuating bar, means for normally holding the plate at one end of its movement, means for locking the plate at the other end of its movement, the plate being adapted to contact with and release the rod from engagement with the lever, a spring secured to the main connecting rod and to a member that actuates the scale beam, and means, actuated by the change in length of the spring caused by the weight of a load on the platform, for releasing the plate locking means to allow the plate to be returned to its normal position when the load on the platform is decreased.

16. In a scale, a frame, a platform and a scale beam mounted on the frame, a main connecting rod and an auxiliary connecting rod connected to the platform so as to be actuated by a load placed thereon, a lever carried by the frame, one end of the lever being adapted to be engaged by the auxiliary connecting rod, a projection upon the lever, a second lever carried by the frame, said second lever being normally locked in position by the projection on the first lever and being released therefrom by the weight of a load on the platform, an actuating bar connected to the lever, a sliding plate adapted to be temporarily connected to the actuating bar, means for normally holding the plate at one end of its movement, means for locking the plate at the other end of its movement, the plate being adapted to contact with and release the rod from engagement with the lever, a spring secured to the main connecting rod and to a member that actuates the scale beam, and means, actuated by the change in length of the spring caused by the weight of a load on the platform, for releasing the plate locking means to allow the plate to be returned to its normal position when the load on the platform is increased.

17. In a scale, a frame, a platform and a scale beam mounted on the frame, a main connecting rod and an auxiliary connecting rod connected to the platform so as to be actuated by a load placed thereon, a lever carried by the frame, one end of the lever being adapted to be engaged by the auxiliary connecting rod, a projection upon the lever, a second lever carried by the frame, said second lever being normally locked in position by the projection on the first lever and being released therefrom by the weight of a load on the platform, an actuating bar connected to the lever, a sliding plate adapted to be temporarily connected to the actuating bar, means for normally holding the plate at one end of its movement, means for locking the plate at the other end of its movement, the plate being adapted to contact with and release the rod from engagement with the lever, a spring secured to the main connecting rod and to a member that actuates the scale beam, a pivot on the member, a third lever mounted on the pivot, said third lever being adapted to contact with the plate-locking means, and means, actuated by the change in length of the spring caused by the weight of a load on the platform, for turning the lever to release the plate-locking means to allow the plate to be returned to its normal position when the load on the platform is either decreased or increased.

18. In a scale, a frame, a platform and a scale beam mounted on the frame, a main connecting rod and an auxiliary connecting rod connected to the platform so as to be actuated by a load placed thereon, a lever carried by the frame, one end of the lever being adapted to be engaged by the auxiliary connecting rod, a projection upon the lever, a second lever carried by the frame, said second lever being normally locked in position by the projection on the first lever and being released therefrom by the weight of a load on the platform, an actuating bar connected to the lever, a sliding plate adapted to be temporarily connected to the actuating bar, means for normally holding the plate at one end of its movement, means for locking the plate at the other end of its movement, the plate being adapted to contact with and release the rod from engagement with the lever, a spring secured to the main connecting rod and to a member that actuates the scale beam, a pivot on the member, a third lever mounted on the pivot, said third lever adapted to contact with the plate locking means, a ratchet-bar attached to the lever and having a slot therein, a pin projecting from the member and engaging with the slot to guide the ratchet-bar, a block secured to the main connecting rod and movable therewith, a ratchet mounted on the block and adapted to engage with the teeth on the ratchet-bar, said ratchet and ratchet-bar being adapted to turn the lever to release the plate locking means to allow the plate to be returned to its normal position when the load on the platform is decreased.

19. In a scale, a frame, a platform and a scale beam mounted on the frame, a main connecting rod and an auxiliary connecting rod connected to the platform so as to be actuated by a load placed thereon, a lever carried by the frame, one end of the lever being adapted to be engaged by the auxiliary connecting rod, a projection upon the lever, a second lever carried by the frame, said second lever being normally locked in position by the projection on the first lever and being released therefrom by the weight of a load on the platform, an actuating bar connected to the lever, a sliding plate adapted to be temporarily connected to the actuating bar, means for normally holding the plate at one end of its movement, means for locking the plate at the other end of its movement, the plate being adapted to contact with and release the rod from engagement with the lever, a spring secured to the main connecting rod and to a member that actuates the scale beam, a pivot on the member, a third lever mounted on the pivot, said third lever adapted to contact with the plate locking means, a ratchet-bar attached to the lever and having a slot therein, a block secured to the main connecting rod, a pin projecting from the block, a ratchet-bar connected to the third lever, a slot in the ratchet-bar in which the pin engages, to guide the bar, and a ratchet mounted on the block and adapted to engage with the teeth on the ratchet-bar, said ratchet and ratchet-bar being adapted to turn the lever to release the plate locking means to allow the plate to be returned to its normal position when the load on the platform is increased.

20. In a scale, a frame, a platform and a scale beam mounted on the frame, a main connecting rod and an auxiliary connecting rod connected to the platform so as to be actuated by a load placed thereon, a lever carried by the frame, one end of the lever being adapted to be engaged by the auxiliary rod, means for breaking the engagement of the lever with the auxiliary rod, said means comprising a movable plate, means for normally holding the plate at one end of its movement, means for locking the plate at the other end of its movement, the main connecting rod having one end of a spring secured thereto, the other end of the spring being secured to a member that actuates the scale beam, a pivot on the member, a second lever mounted on the pivot, said second lever being adapted to release the plate locking means from engagement with the plate, a ratchet-bar attached to the lever, a block secured to the main connecting rod, and a ratchet mounted on the block and adapted to engage with the ratchet-bar, means connected to the sliding plate for moving the ratchet toward the position in which it engages with the ratchet-bar, and means connected to the first mentioned lever for preventing such engagement before the connection between the auxiliary connecting rod and the lever is broken.

21. In a scale, a frame, a platform and a scale beam mounted on the frame, a main connecting rod and an auxiliary connecting rod connected to the platform so as to be actuated by a load placed thereon, a lever carried by the frame, one end of the lever being adapted to be engaged by the auxiliary rod, an arm on the lever, said arm having a perforation therein, means for breaking the engagement of the lever with the auxiliary rod, said means comprising a movable plate, means for normally holding the plate at one end of its movement, means for locking the plate at the other end of its movement, the main connecting rod having one end of a spring secured thereto, the other end of the spring being secured to a member that actuates the scale beam, a pivot on the member, a second lever mounted on the pivot, said second lever being adapted to release the plate locking means from engagement with the plate, a ratchet-bar attached to the lever, a block secured to the main connecting rod, and a ratchet mounted on the block and adapted to engage with the ratchet-bar, means connected to the sliding plate for moving the ratchet toward the position in which it engages with the ratchet-bar, a wire connected to the ratchet and passing through the perforation in the lever arm, said wire being of such length as to prevent the ratchet from engaging with the ratchet-bar before the connection between the auxiliary connecting rod and the lever is broken.

22. In a scale, a frame, a platform and a scale beam mounted on the frame, a main connecting rod and an auxiliary connecting rod connected to the platform so as to be actuated by a load placed thereon, a lever carried by the frame, one end of the lever being adapted to be engaged by the auxiliary rod, means for breaking the engagement of the lever with the auxiliary rod, said means comprising a movable plate, means for normally holding the plate at one end of its movement, means for locking the plate at the other end of its movement, the main connecting rod having one end of a spring secured thereto, the other end of the spring being secured to a member that actuates the scale beam, a pivot on the member, a second lever mounted on the pivot, said second lever being adapted to release the plate locking means from engagement with the plate, a ratchet-bar attached to the lever, a block secured to the main connecting rod, a ratchet mounted on the block and adapted to engage with the ratchet-bar, a second ratchet-bar attached to the lever at a point on the opposite side of the pivot from that at which the first ratchet-bar is attached, a second ratchet mounted on the block and adapted to engage with the second ratchet-bar, means whereby the second ratchet is prevented from engaging with its ratchet-bar except when the first ratchet is in engagement with the first ratchet-bar, means connected to the sliding plate for moving the first ratchet toward the position in which it engages with the first ratchet-bar, and means connected to the first mentioned lever for preventing such engagement before the connection between the auxiliary connecting rod and the lever is broken.

In testimony whereof I have signed this specification in the presence of two subscribing witnesses.

ADOLPH A. CAILLE.

Witnesses:
EDGAR ELLIOTT,
THEO. L. SMITH, Jr.